United States Patent [19]
Wulff

[11] Patent Number: 5,630,975
[45] Date of Patent: May 20, 1997

[54] METHOD AND A DEVICE FOR JOINING AT LEAST TWO PLASTIC ELEMENTS IN A LIQUID- AND/OR GASTIGHT MANNER

[75] Inventor: Frederik K. A. Wulff, GG Rotterdam, Netherlands

[73] Assignee: Nyloplast Europe B.V., 's-Gravendeel, Netherlands

[21] Appl. No.: 333,511

[22] Filed: Nov. 2, 1994

[30] Foreign Application Priority Data

Nov. 5, 1993 [NL] Netherlands ............... 9301914

[51] Int. Cl.$^6$ ..................................... B29C 65/70
[52] U.S. Cl. ................. 264/138; 156/304.2; 156/304.5; 156/304.6; 264/248; 264/249; 264/DIG. 46; 425/508; 425/517; 425/520; 425/DIG. 13
[58] Field of Search .......................... 425/507, 508, 425/509, 517, 520, DIG. 13; 264/248, 249, 295, 296, DIG. 46, 138; 156/158, 499, 502, 503, 304.2, 304.3, 304.5, 304.6

[56] References Cited

U.S. PATENT DOCUMENTS

| | | | |
|---|---|---|---|
| 3,634,167 | 1/1972 | Plontke ........................... | 156/158 |
| 3,798,097 | 3/1974 | Mendenhall . | |
| 3,873,391 | 3/1975 | Plauka et al. ................... | 156/304.3 |
| 4,533,424 | 8/1985 | McElroy .......................... | 425/517 |
| 4,927,642 | 5/1990 | Kunz ............................... | 425/508 |
| 4,954,299 | 9/1990 | Greig et al. ..................... | 264/248 |
| 4,994,132 | 2/1991 | Liekens et al. ................. | 264/249 |
| 5,094,795 | 3/1992 | McMillan et al. ............... | 264/249 |
| 5,223,189 | 6/1993 | Friedrich ......................... | 264/248 |
| 5,342,470 | 8/1994 | Meirana ......................... | 156/304.2 |

FOREIGN PATENT DOCUMENTS

| | | |
|---|---|---|
| 1271863 | 8/1961 | France . |
| 163029 | 6/1992 | Japan . |
| 163128 | 6/1992 | Japan . |
| 163129 | 6/1992 | Japan . |
| 6513219 | 8/1966 | Netherlands . |
| 180040 | 6/1973 | Netherlands . |
| 7216939 | 6/1973 | Netherlands . |
| 7605427 | 11/1977 | Netherlands . |
| 8006882 | 7/1982 | Netherlands . |
| 8800527 | 1/1989 | Netherlands . |
| 8701920 | 3/1989 | Netherlands . |
| 8902881 | 6/1991 | Netherlands . |
| 9001624 | 2/1992 | Netherlands . |
| 9100537 | 10/1992 | Netherlands . |
| 9100917 | 12/1992 | Netherlands . |
| 928912 | 6/1963 | United Kingdom . |

*Primary Examiner*—Mathieu D. Vargot
*Attorney, Agent, or Firm*—Curtis, Morris & Safford, P.C.

[57] ABSTRACT

A method for joining at least two plastic elements in a liquid-and/or gastight manner, whereby an edge of a first plastic element is at least partially placed in an opening of a second plastic element, the edge of the first plastic element being folded over an edge of the opening of the second plastic element under plastic deformation, using a pressure device. The edge of the first plastic element is pressed against a curved butting face of a pressure body placed in the second plastic element at the opening thereof and the edge of the first plastic element along the butting face is pushed radially outwardly and over the edge of the opening of the second plastic element. The edges of both plastic elements are pressed together by exerting pressure on both sides of the edges. Alternatively, use is made of a sealing ring at least partially between the edges.

24 Claims, 7 Drawing Sheets

METHOD AND A DEVICE FOR JOINING AT LEAST TWO PLASTIC ELEMENTS IN A LIQUID- AND/OR GASTIGHT MANNER

FIELD OF THE INVENTION

The invention relates to a method and a device for joining at least two plastic elements in a liquid- and/or gastight manner.

BACKGROUND OF THE INVENTION

A method and a device for joining two plastic pipe-like elements are generally known. The joining of two plastic elements usually needs to take place in a liquid- and/or gastight manner. In this connection, the liquid- and/or gastight joining of two pipe sections, for example, thermoplastic (PVC) pipe sections for use in sewage pipes, rainwater pipes, gas pipes, drainpipes etc. are of particular consideration. In view of the large number of applications it will be apparent that liquid- and/or gastight pipe sections may be quite different from each other, not only as regards their shape but also as regards their technical characteristics, since generally each application has its specific requirements (relating to technique and shape). Thus pipe sections made of various plastic materials, of various shapes and of various material thicknesses are known.

A drawback of a known method and a known device is that, in the case of manually joined pipe sections, a constant quality of the joint as regards its liquid- and/or gastightness is not always achieved, while the (production) costs involved are often very high, and that, when the work is carried out by mechanical means (e.g. injection molding), it is not possible to obtain the required flexibility for joining different kinds of plastic elements (in particular different as to shape and diameter) at acceptable cost.

The present invention particularly relates to a method and a device for Joining at least two plastic elements in a liquid- and/or gastight manner, whereby an edge of a first plastic element is at least partially placed in an opening of a second plastic element, the edge of the first plastic element being folded using pressure means over an edge of the opening of the second plastic element under plastic deformation.

Such a method is known from U.S. Pat. No. 3,798,097 to Mendenhall. This known method of joining a plastic tube to the side of a plastic pipe to make a branched conduit, comprises the steps of:

forming a hole in the side of a pipe smaller than the size of the tube;

softening the pipe around the hole by means of a hot oil bath;

deforming the pipe outwardly around the hole to form an outwardly projecting flange, while expanding the hole to a size sufficient to receive the tube;

softening one end portion of the tube to a temperature at which it is plastically deformable and inserting the softened end portion into the hole;

plastically deforming said the end portion into an enlarged lip abutting the inside of the pipe around the hole;

hardening the end in the deformed condition;

applying PVC solvent cement between the abutting portions of the tube and pipe;

applying pressure (using an inflatable balloon) to the abutting portions to press them together during bonding; and relieving the pressure after the tube and pipe are bonded together.

A drawback of the method disclosed in U.S. Pat. No. 3,798,097 is that the pressure exerted by the inflatable balloon on the above-mentioned abutting portions to press them together, is inadequate to provide an effective liquid- and/or gastight bond between the tube and the pipe. A further drawback of this method is that the use of PVC solvent cement as a bonding material is needed. This not only renders the method uneconomical and difficult to apply, but the bond also deteriorates after a period of time. This has negative effects on the quality of the bond between the tube and the pipe. A further drawback is that the tube and the pipe can only be joined at an angle of 90° limiting the applicability of this method. Still a further drawback is that the method of this U.S. patent is complicated and expensive in view of the use of the different materials and steps, e.g. expanding mandril, inflatable balloon, hot oil bath, PVC solvent cement etc.

OBJECTS OF THE INVENTION

An object of the present invention is to provide a very economical, highly flexible (as regards production possibilities) and reliable method and device for joining at least two plastic elements in a really liquid- and/or gastight manner, i.e., with a bond of high quality.

SUMMARY OF THE INVENTION

In order to accomplish this objective, a method is provided wherein an edge of a first plastic element is pressed against a curved butting face of a pressure body placed in the second plastic element at the opening thereof. The edge of the first plastic element along the butting face is pushed radially outwardly and over the edge of the opening of the second plastic element and the edges of both plastic elements are pressed together by exerting pressure on opposite sides of the edges. Further, use is made of a sealing ring at least partially between the edges.

In a preferred embodiment of the invention the second plastic element is telescoped over the pressure body in such a manner that the pressure body is located near the opening of the second plastic element. The first plastic element is preferably placed in the opening of the second plastic element by hand, and slightly pressed against the pressure body. Then the first plastic element is pressed against the pressure body by pressure means, to fold the edge of the first plastic element over the edge of the opening of the second plastic element. By exerting pressure on opposite sides of the edges, the edges are pressed firmly together, providing in combination with a sealing ring, an excellent liquid- and/or gastight joining of the plastic elements. Pressure is exerted on opposite sides of the edges so that there is no limitation as to the amount of pressure exerted and no fractures in the material of the plastic elements occur.

In another embodiment of the method according to the invention the edge of the opening of the second plastic element is clamped between edges of the first plastic element. This increases the firmness of the joint between the two elements.

In another embodiment of the method according to the invention at least two plastic elements are joined at an angle varying between 0° and 180°.

In another embodiment of the method according to the invention the two plastic elements are pipe sections.

In another embodiment of a method according to the invention the plastic deformation is achieved by heating.

In another embodiment of a method according to the invention the pressure body is at least partially heated by heating means present therein. Preferably the heating means are heating elements present within the pressure body, which can be connected to a suitable source of electric current.

In another embodiment of a method according to the invention the edge of a first pipe section is preheated prior to the first pipe section being at least partially placed in the opening of a second pipe section. The advantage of this is that as soon as the edge of the first pipe section is placed in the opening of the second pipe section by hand, and since the edge is lightly pressed against the pressure body, the edge of the first pipe section at this juncture folds over the edge of the opening of the second pipe section.

In another embodiment of a method according to the invention a sealing ring is provided along the opening of the second pipe section before joining the first and second pipe sections. Preferably the sealing ring has a substantially L-shaped or U-shaped cross-section. The sealing ring provides an optimum liquid- and/or gastight joint of the two pipe sections.

In another embodiment of a method according to the invention the opening of the second pipe section is preferably provided by means of a sawing and/or cutting operation, whereby the second pipe section is to be joined at an angle with respect to the first pipe section and the sawing and/or cutting device, being applied at an angle at least substantially corresponding with the joint angle between the first and second pipe sections to be joined. As a result of this a correct shape (for example an elliptic shape) of the opening of the second pipe section is obtained in a particularly simple, elegant manner when the first and second pipe section, are to be joined at an angle of, for example, 45° or 60°.

One embodiment of a device according to the invention is provided with a pressure body comprising a pressure plate. The pressure plate has a butting face having a shape to suit the desired fold, against which the edge of the first pipe section may butt under plastic deformation.

In another embodiment of a device according to the invention the pressure plate comprises at least two parts, which are movable with respect to each other. This is important when the diameter of the opening of the second pipe section is at least substantially larger than the diameter of the first pipe section itself. By moving the parts of the pressure plate with respect to each other the effective diameter of the pressure plate may be altered, as a result of which it will be easy to slip the second pipe section over the pressure plate. When the pressure plate is located near the opening of the second pipe section, the parts of the pressure plate are returned to their initial position with respect to each other.

In another embodiment of the device according to the invention the pressure plate is provided with electric heating means.

In another embodiment of a device according to the invention the pressure means include a piston/cylinder assembly. The piston/cylinder assembly may, for example, exert pressure on the first pipe section via a pressure disk.

In another embodiment of a device according to the invention pressure means are provided with a pressure element, which can move into and out of the first pipe section.

In another embodiment of a device according to the invention the pressure element includes a projecting pull rod, which may engage a drawing attachment, which can push or pull the pull rod in a direction parallel to the axis of the first pipe section.

In another embodiment of a device according to the invention a drawing attachment is provided which comprises a drawing block provided with means for engaging a pull rod, with the drawing block being movable along a line which extends parallel to the central axis of the second pipe section.

The invention will be explained in more detail hereafter with reference to Figures illustrated in the drawing, in which like parts are numbered alike in the various Figures.

DETAILED DESCRIPTION OF PREFERRED EMBODIMENTS

Figure 1:
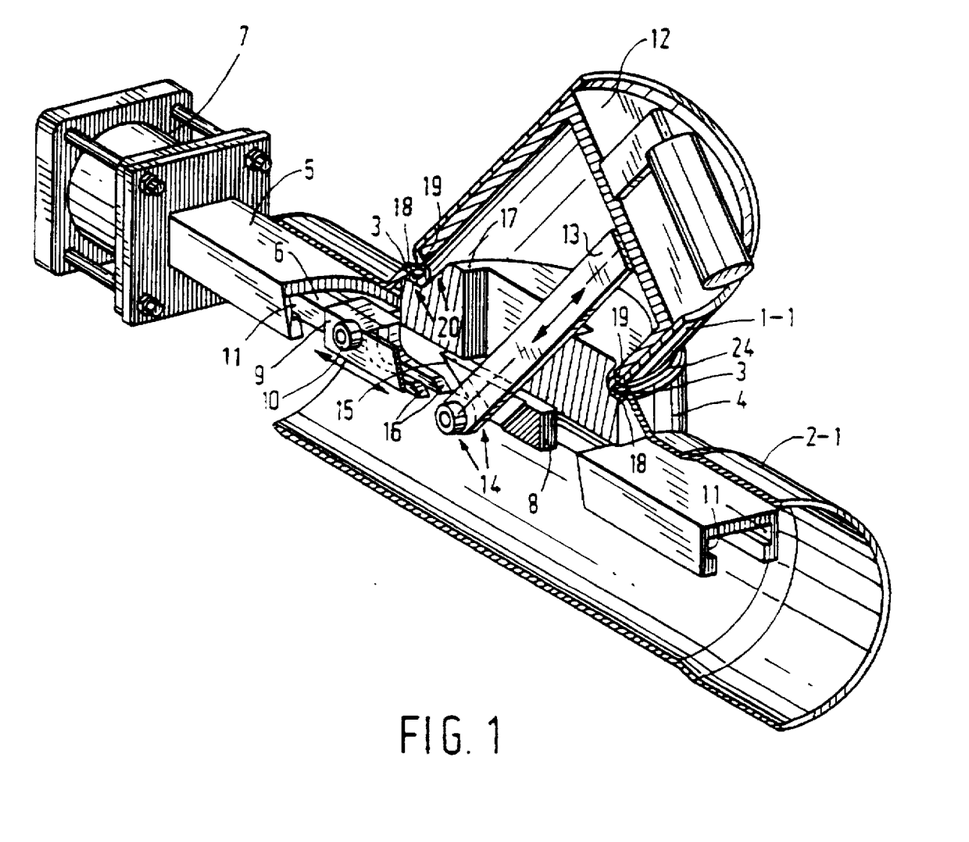
FIG. 1 is a perspective view, partly in section, showing a first embodiment of a device according to the invention, by means of which two plastic pipe sections are joined at an oblique angle with respect to each other.

FIG. 1 shows, partly in section, plastic elements in the shape of pipe sections 1-1 and 2-1. The pipe section 2-1 is provided with an opening having an edge 3, which is directed radially inwardly in the illustrated embodiment. The edge 3 is located on a cylindrical extension or platform 4, which is provided on the pipe section 2-1 and which extends at 90° from section 2-1. To form the joint according to the present invention pipe section 2-1 is telescoped over the pressure joining device which includes an arm 5, in which a rod 6 is located. Rod 6 can move from the left to the right (in the direction indicated by the arrow) by means of a piston/cylinder assembly 7 mounted on one end of arm 5. Piston/cylinder assembly 7 may be either a hydraulically, pneumatically or electrically operated assembly. Pull-push means 8, 9 are secured to the rod 6. A guide system comprising rollers 10 mounted on the pull-push means 8, 9 and guide slots 11 provided longitudinally in arm 5 to receive rollers 10, guides the reciprocating movement of rod 6 within arm 5. Pull-push means 8, 9 form one block.

A pressure applying member is provided in the pipe section 1-1, which in this embodiment of FIG. 1 makes an angle of 45° with the pipe section 2-1. The pressure applying member includes a pressure element 12 in the shape of a closed sleeve like member, which closely abuts the inner circumference of the pipe section 1-1. One end of a pull rod 13 is secured to one side of pressure element 12. The other end of pull rod 13 is provided with guide means 14 in the shape of rollers. Rollers 14 engage guideways 15 and 16 respectively on pull-push means 8, 9 for cooperation with the guideways, so that when the rod 6 moves towards the right together with the pull means 8 and the push means 9, a sloping guideway 16 on pull-push means 8, 9 comes into contact with the guide rollers 14 to push pull rod 13 outwardly. Conversely, when rod 6 moves to the left the guideway 15 and the guide rollers 14 will come into contact with each other and as a result pull rod 13 and thus, pressure element 12 will be pulled inwardly.

When using the method for joining the two pipe section 1-1 and 2-1 in a liquid- and/or gastight manner, pipe section 2-1 is telescoped over arm 5. A pressure body in the shape of a pressure plate 17 integral with arm 5 is positioned near the opening in the pipe section 2-1 formed on platform 4. In order to join the two pipe section 1-1 and 2-1 an edge 18 of the pipe section 1-1 is softened, by preheating the edge 18 in any convenient manner or in a manner yet to be explained in more detail.

To form the joint according to the present invention, the softened edge 18 is folded over edge 3 of the pipe section 2-1 in the following manner. First the pipe section 1-1 is pressed against the pressure plate 17 by hand, as a result of which the preheated edge 18 of the pipe section 1-1 along an abutting surface 20 of the pressure plate 17 is forced radially outwardly to a slight degree. Then the pressure element 12 inserted into the pipe section 1-1 is moved down—first by hand and then via the pull rod 13 in the manner described above. As a result of this movement of pressure element 12, the edges 18 and 19 of the pipe section 1-1 with the edge 3 of the pipe section 2-1 located therebetween will be pressed together by the movement of pressure element 12 in contact with the edges 18 and 19 and the reactive force provided by pressure plate 17, thus forming a liquid- and/or gastight joint.

Figure 2:
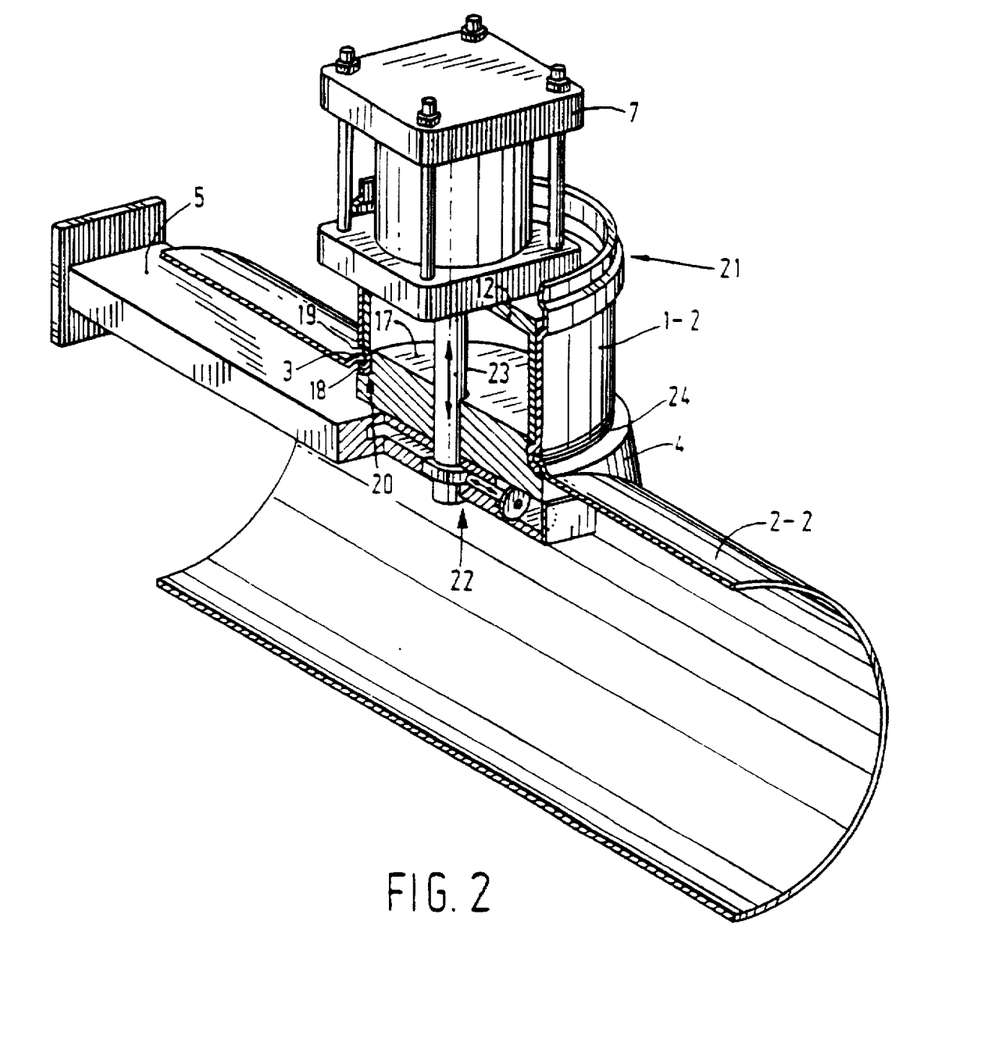
FIGS. 2 and 3 are views similar to FIG. 1 showing a second and a third embodiment, respectively, of a device according to the invention, wherein two plastic elements are joined at a right angle with respect to each other.

Another illustrated embodiment of the device for making a joint between two pipe-sections is shown in FIG. 2. In this embodiment a substantially perpendicular joint between pipe sections 1-2 and 2-2 is made by means of the piston/cylinder assembly 7 provided within the pipe section 1-2. After the pipe section 2-2 has been telescoped over arm 5 and pressure plate 17 and pressure element 12 has been introduced into pipe section 1-2, a pull rod 23 of the piston/cylinder assembly 7 is locked to arm 5 under pressure plate 17 by locking means 22. Upon activation of the piston/cylinder assembly 7, the edges 18 and 19 of pipe section 1-1 and the edge 3 of pipe section 2-2 are pressed together in the same manner as explained above with respect to FIG. 1, thus providing the liquid- and/or gastight joint.

Figure 3:
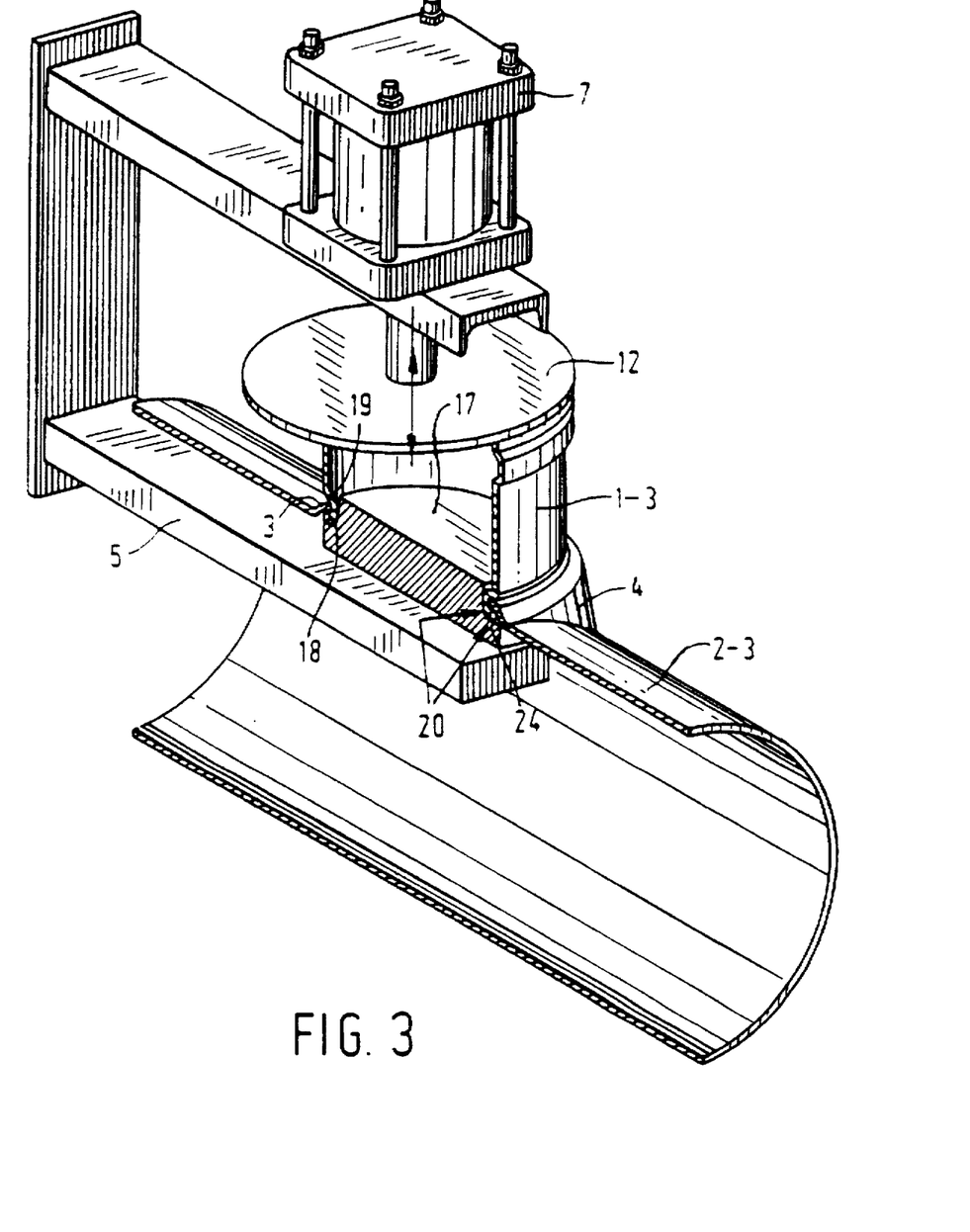

FIG. 3 illustrates another embodiment of the device according to the invention, corresponding with the one shown in FIG. 2. In this embodiment the pressure means for pressing edge 18 of the first pipe section 13 against pressure plate 17 are not in the form of the pressure element 12 fitting within pipe section 1-3, but in the form of a pressure disk 12 which is pressed against the free end of the pipe section 1-3 by means of the piston/cylinder assembly 7. Thus, the external force from pressure disk 12 forms the liquid- and/or gastight joint.

As seen by the embodiment of FIGS. 2 and 3, it is not essential for the present invention in what manner the respective edges 18, 19 and 3 are folded together. With the manner illustrated with regard to these two embodiments, the respective edges 18, 19 and 3 are brought together in such a manner, that the edge 3 is clamped between the two edges 18 and 19 located on either side of the edge 3. These sections of the pipe collapse about edge 3 in a U-shaped fold to form the seal.

Figure 4:
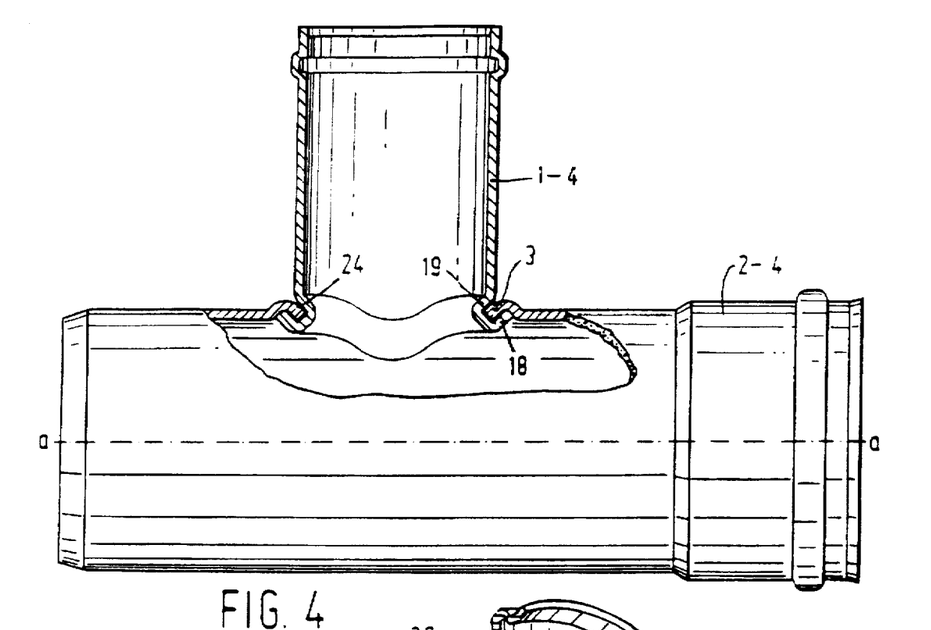
FIGS. 4–7 show examples of joints between two plastic elements made in accordance with the method according to the invention with the pressure forming device omitted.

As illustrated in the embodiment shown in FIG. 4, in like manner edge 3, which does not show the pressure plate and assembly, is folded back in the direction of the central axis a—a of the pipe section 2-4. Of course the shape of the actual pressure part of the pressure element 12 (not shown in this Figure), as well as the butting face 20 of the pressure plate 17 (likewise not shown) are shaped, as will be understood by one of ordinary skill in the art, with a view to making a joint of the type.

Figure 5:
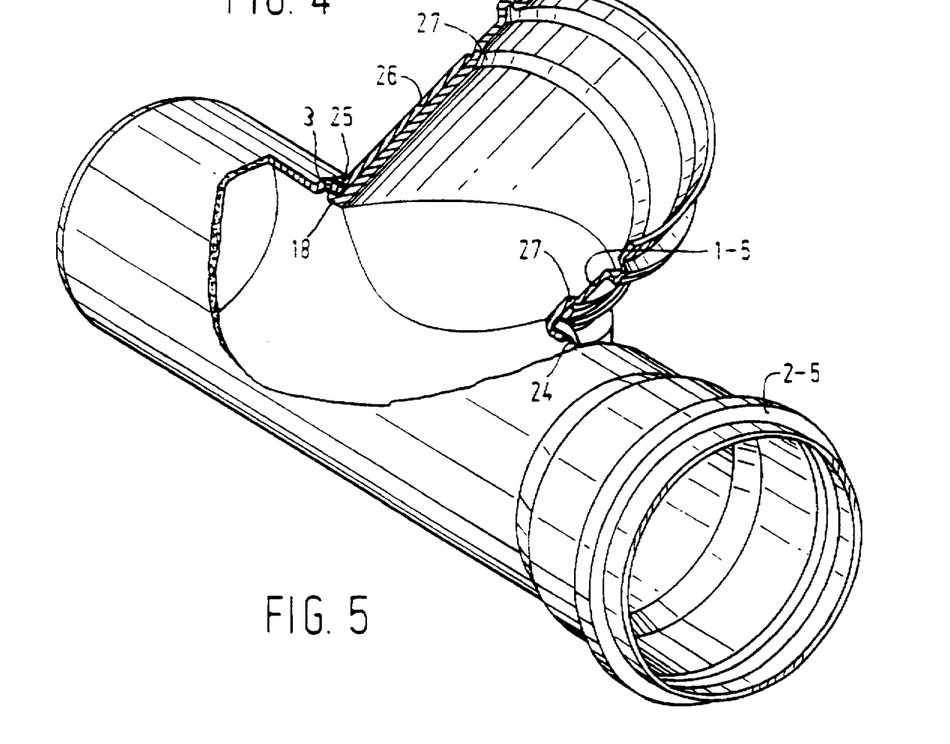

FIG. 5 shows an embodiment of a joint between pipe sections 1-5 and 2-5, in which edge 3 of pipe section 2-5 is clamped between radially outwardly flared edge 18 and an edge 25 of a pipe 26 telescoped over pipe section 1-5 beforehand. Pipe 26 functions to locally strengthen pipe 1-5 and is used in this specific embodiment for the joint to be formed. The joint is made by moving pressure element 12 (not shown in this Figure) downwardly in the direction of pressure plate 17 (likewise not shown) in the manner explained above. In this embodiment the actual pressure part of the pressure element 12 presses down on the outer circumferential edge 27 of the pipe section 1-5 as disclosed in the embodiment of FIG. 3 when the method according to the invention is used.

Figure 6:
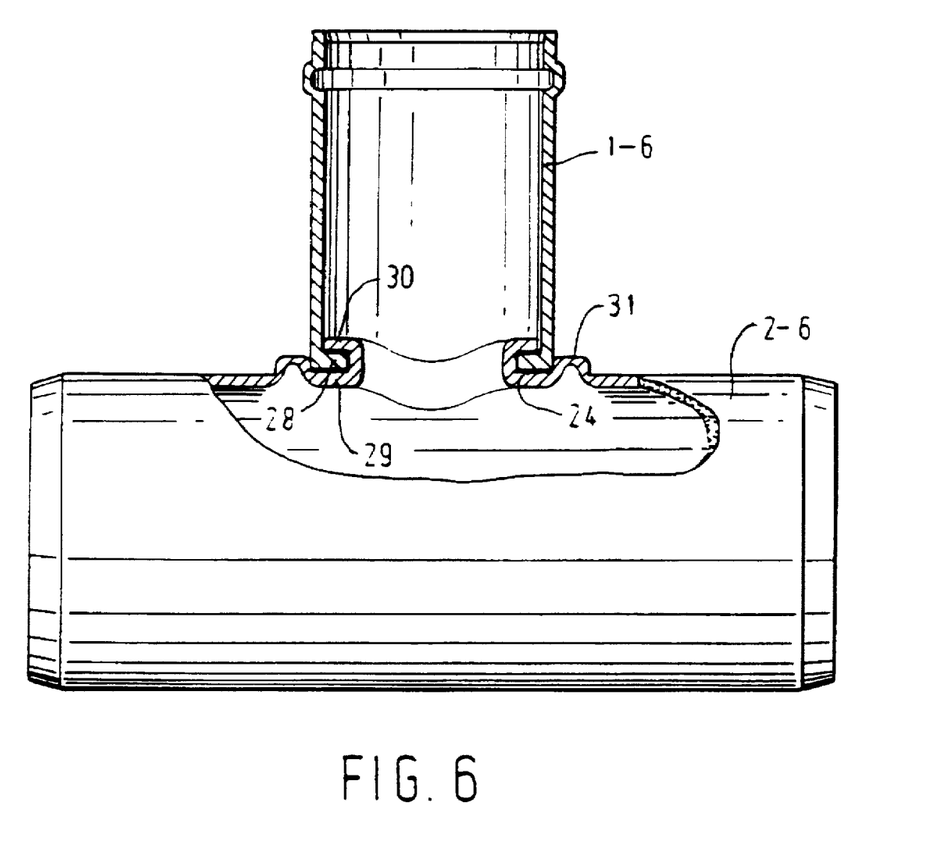

FIG. 6 shows an embodiment of a joint between pipe sections 1-6 and 2-6. Section 1-6 after assembly according to the method described above, has a radially inward edge 28, which is enclosed by edges 29 and 30 shaped in a U-shape fold of pipe section 2-6. This embodiment moreover shows that a shoulder 31 may also be provided around the edges 18, 19 and 30 to be joined. Shoulder 31 provides additional mechanical strength and stability to the joint. It is possible to leave out the shoulder 31 per se, if the liquid- and/or gas pressure built up within the pipe section 1-\6 and 2-6 is not too large in practice.

Figures 7, 8:
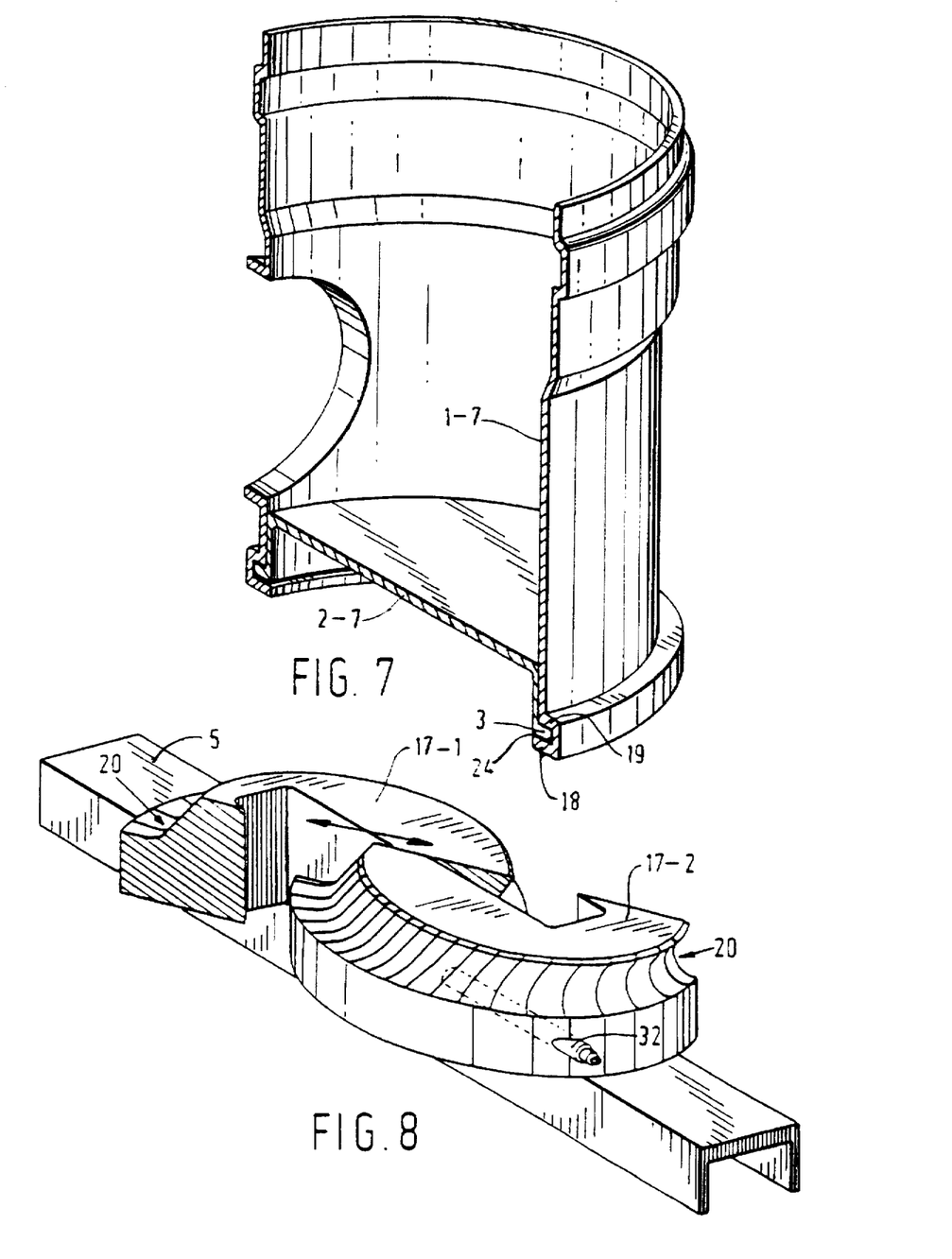
FIG. 8 shows a two-part pressure body for use in the device of FIG. 1.

FIG. 7 shows an embodiment wherein a pipe section 1-7 is provided with a plastic element 2-7 in the shape of a bottom member joined to the pipe section in the manner described above with respect to FIG. 6. This embodiment is useful where it is desired to seal off an end of an open pipe.

In all the above-described embodiments, in order to obtain an improved seal between the two pipe sections it is possible, if desired, to use a sealing ring 24, which may for example have an L-shaped or U-shaped cross-section. If a sealing ring is desired, the sealing ring 24 is preferably slipped between the two edges to be joined prior to joining the pipe sections, whereupon the edges are clamped together under plastic deformation with the sealing ring 24 disposed therebetween.

When joining the respective pipe sections at a desired angle with respect to each other, the angle at which a sawing and/or cutting device is used to provide the opening in one of the pipes should preferably be chosen such that the cutting angle is substantially the same as the angle which the respective pipe sections will make with each other. This leads to a great dimensional accuracy of the oval or circular (in case of an angle of 90°) opening to be formed in the pipe.

Before the edges are joined it is possible to soften in particular the edges 3, 18, 19, 28, 29 and 30 in question, if desired, by exposing said edges to hot air or a hot object. Alternatively, pressure plate 17, may be provided with (preferably electric) heating means 32 (diagrammatically indicated in FIG. 8). Pressure plate 17 is thereby heated in such a manner that the aforesaid edges slightly cool down by shutting off the heating current under optimal conditions, after the joint is formed while the pressure plate remains in place so that a liquid- and/or gastight joint is formed.

When for example the first pipe section 1-1 has a diameter larger than (or equal to) the diameter of the second pipe section 2-1, it is preferred to design the pressure plate 17 as a multi-part plate, more in particular a two-part plate. Such a pressure plate 17 built up of two parts 17-1 and 17-2 is shown in FIG. 8. With this plate it is still possible to telescope the second pipe section 2-1 over pressure plate 17, which has a smaller (or the same) diameter, and bring the parts 17-1 and 17-2 of the pressure plate 17 together at the location of the opening already formed in the pipe, so as to attach a first larger-diameter pipe section 1-1 in the manner explained above.

Figure 9:
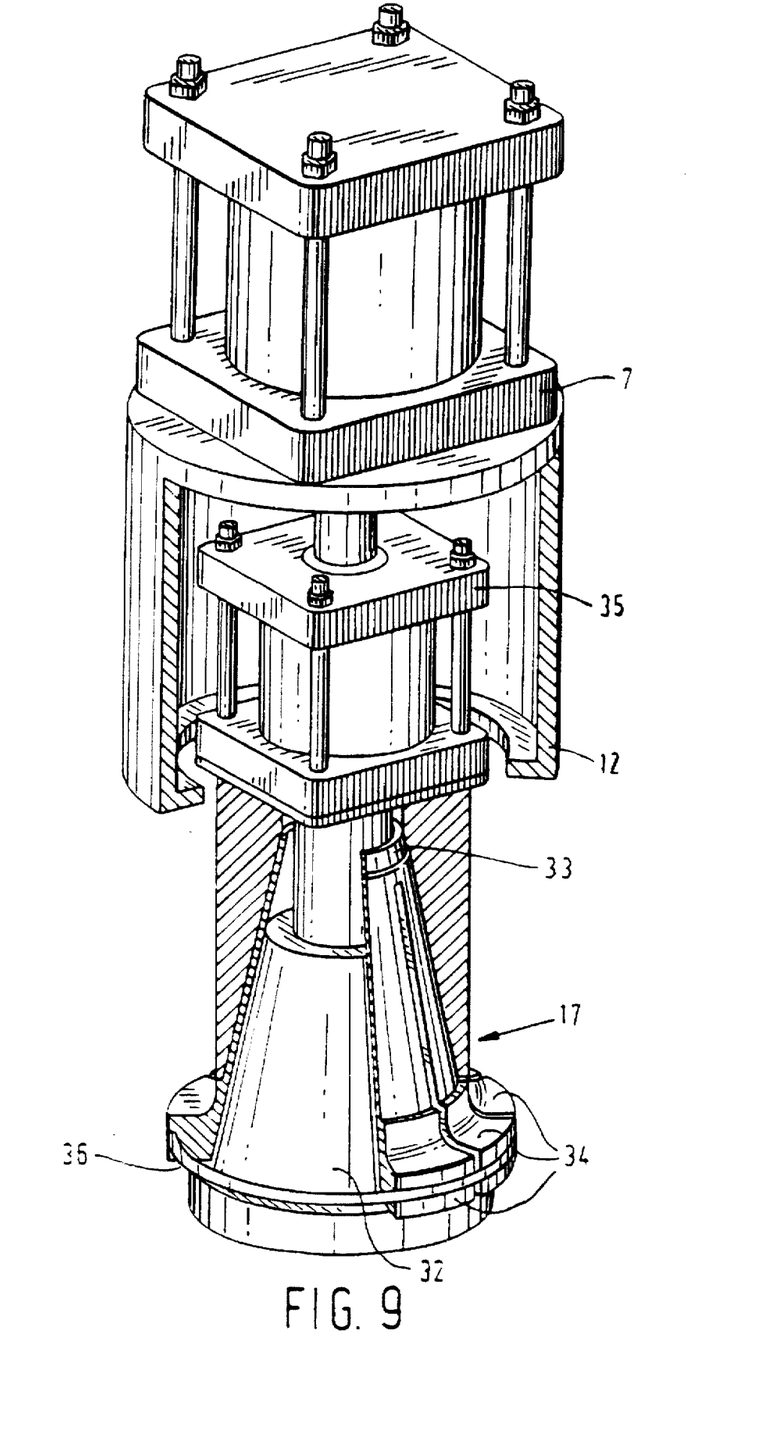
FIG. 9 shows another embodiment of a device according to the invention, by means of which a first plastic element can be joined in situ to a second plastic element already in use.

FIG. 9 diagrammatically shows a device according to the invention, by means of which a first pipe section (not shown) can be joined in situ to a second pipe section (likewise not shown) already in use in the field. The device is provided with a pressure body 17 built up of a cone 32, which can move reciprocatingly, actuated by a piston/cylinder assembly 35, along the inner surface of a cone shell 33 provided with spring-loaded tongues. The spring-loaded tongues are under a radially inward pressure of an extension spring 36. The cone shell 33 with the spring-loaded tongues 34 are shown in a position in which the device an be inserted into an opening formed in a second pipe section already being in use. Once present in the newly formed opening, the cone 32 will move up with respect to the illustrated position under the influence of the piston/cylinder assembly 35, so that the spring-loaded tongues within the second pipe section spread out, temporarily fixing the device with respect to the second pipe section. Then the pressure element 12 is moved downwardly by means of the piston/cylinder assembly 7 (thereby exerting pressure on the free outer circumferential edge of the first pipe section in a manner corresponding with the embodiment of FIG. 3), so that the edges of the first and the second pipe sections are clamped together in the manner explained above. Accordingly the radially outward parts of the tongues 34 thereby function as a pressure plate. The device proposed herein is particularly suitable for joining pipe sections in situ in a liquid- and/or gastight manner.

What is claimed is:

1. A method for joining at least two plastic elements in a liquid- and/or gastight manner, comprising placing an edge of a first plastic element at least partially in an opening of a second plastic element, folding the edge of said first plastic element over an edge of said opening of the second plastic element under plastic deformation, using pressure means, wherein said first plastic element is pressed against a curved butting face of a pressure body placed in said second plastic element at the opening thereof and being supported independently therefrom such that said edge of said first plastic element is pushed radially outwardly and over said edge of the opening of said second plastic element, pressing together said edges of both plastic elements to form a joint, and exerting pressure on both sides of the joint using a pressure element and a pressure body which cooperate with each other to thereby form a liquid and/or gastight joint.

2. A method according to claim 1, wherein said edge of the opening of said second plastic element is clamped between edges of said first plastic element.

3. A method according to claim 1, wherein the at least two plastic elements are joined at an angle varying between 0° and 180°.

4. A method according to claim 1, wherein the at least two plastic elements are pipe sections.

5. A method according to any of claims 1 to 4, wherein said plastic deformation is achieved by heating.

6. A method according to claim 1, wherein said plastic deformation is achieved by heating and wherein said pressure body is at least partially heated by heating means present in said pressure body.

7. A method according to any of claims 1 to 4, wherein the edge of said first plastic element is preheated prior to said first pipe section being placed, at least partially, in the opening of said second pipe section.

8. A method according to any of claims 1 to 4 and 6, including providing a sealing ring along the opening of said second section prior to Joining said first and said second sections.

9. A method according to any of claims 1 to 4 and 6, including providing a sealing ring along the opening of said second section prior to joining said first and said second sections, wherein said sealing ring has a substantially L-shaped or U-shaped cross-section.

10. A method according to any of claims 1 to 4 and 6, wherein the opening of said second section is provided by means of a sawing and/or cutting operation, whereby said second section is held at an angle with respect to a said sawing and/or cutting device, said angle at least substantially corresponding with an angle between the joined first and second sections.

11. A device for joining at least two plastic elements in a liquid- and/or gastight manner including a first pipe-like member and a second pipe-like member where the second pipe-like member includes an opening therein and the first pipe-like member is positioned with one end at least partially disposed in said opening in said second pipe-like member, said device comprising a pressure body disposed within said opening in said second pipe-like member and being supported independently therefrom, a pressure element positionable with respect to said first pipe-like member such that an axially directed force can be imparted on said first pipe-like member by movement of said pressure element in the direction of the axis of said first pipe-like member, means for pushing an abutting edge of the first pipe-like member against a curved butting face of said pressure body placed in said second pipe-like member at the opening thereof so that the abutting edge of said first pipe-like member is pushed radially outwardly as a result of an edge of the opening of said second pipe-like member being clamped between edges of said first pipe-like member, and means for pressing said edges of said first and second pipe-like members together to form a joint.

12. A device according to claim 11 wherein said means for applying said axially directed force is a piston assembly.

13. A device according to claim 12 wherein said piston assembly is a pneumatic or hydraulic cylinder.

14. A device according to claim 12 wherein said piston assembly is electrically actuated.

15. A device according to claim 11 wherein said pressure element is movable within said first pipe-like member into said second pipe-like member thereby to plastically deform the edges of said first and second pipe-like members against said pressure body to join said members together.

16. A device according to claim 15 including heating means associated with said pressure body for heating the edges of said first and second pipe-like members to be joined.

17. A device according to claim 11 wherein said pressure body is a two part member with each member movable with respect to the other to accommodate joining pipe-like members of different diameters.

18. A device according to claim 12 wherein said piston assembly is movable along a path coaxial with said second pipe-like member and engages a rod fixed to said pressure element to move said pressure element along a path coaxial with said first pipe-like member.

19. A device according to claim 12 wherein said piston assembly is movable along a path coaxial with said first pipe-like member and engages a rod fixed to said pressure element to move said pressure plate means along a path coaxial with said first pipe-like member.

20. A device according to claim 12 wherein said pressure element is disposed within said first pipe-like member and includes means adjacent said edge of said first pipe-like member to plastically deform said edge when said pressure element is moved against said pressure body to join said members together.

21. A device according to claim 11 for joining at least two plastic pipe-like members in situ, wherein said pressure body includes spreading means movable between a first position in which said spreading means can be readily placed within said opening in said second pipe-like member and a second position radially outwardly from said first position.

22. A device according to claim 21, wherein said spreading means includes a first conical member movable along the inner surface of a conical shell member under the action of springloaded tongues.

23. A device for joining at least two plastic elements in a liquid- and/or gastight manner including a first pipe-like member and a second pipe-like member where the second pipe-like member includes an opening therein and the first pipe-like member is positioned with one end at least partially disposed in said opening in said second pipe-like member, said device comprising a pressure body disposed within said opening in said second pipe-like member, a pressure element positionable with respect to said first pipe-like member such that an axially directed force can be imparted on said first pipe-like member, by movement of said pressure element in the direction of the axis of said first pipe-like member, means for pushing an abutting edge of the first pipe-like member against a curved butting face of said pressure body placed in said second pipe-like member at the opening thereof so that the abutting edge of said first pipe-like member is pushed radially outwardly as a result of an edge of the opening of said second pipe-like member being clamped between edges of said first pipe-like member, and further including means for pressing said edges of said first and second pipe-like members together to thereby form a joint, and wherein said means for applying said axially directed force is a piston assembly which is movable along a path coaxial with said second pipe-like member and engages a rod fixed to said pressure element to move said pressure element along a path coaxial with said first pipe-like member.

24. A device for joining at least two plastic elements in a liquid- and/or gastight manner including a first pipe-like member and a second pipe-like member where the second pipe-like member includes an opening therein and the first pipe-like member is positioned with one end at least partially disposed in said opening in said second pipe-like member, said device comprising a pressure body disposed within said opening in said second pipe-like member, a pressure element positionable with respect to said first pipe-like member such that an axially directed force can be imparted on said first pipe-like member by movement of said pressure element in the direction of the axis of said first pipe-like member, means for pushing an abutting edge of the first pipe-like member against a curved butting face of said pressure body placed in said second pipe-like member at the opening thereof so that the abutting edge of said first pipe-like member is pushed radially outwardly as a result of an edge of the opening of said second pipe-like member being clamped between edges of said first pipe-like member, and further including means for pressing said edges of said first and second pipe-like members together to thereby form a joint, and wherein said means for applying said axially directed force is a piston assembly which is movable along a path coaxial with said first pipe-like member and engages a rod fixed to said pressure element to move said pressure element along a path coaxial with said first pipe-like member.

* * * * *

UNITED STATES PATENT AND TRADEMARK OFFICE
CERTIFICATE OF CORRECTION

PATENT NO. : 5,630,975
DATED : May 20, 1997
INVENTOR(S) : Frederik K.A. Wulff

It is certified that error appears in the above-indentified patent and that said Letters Patent is hereby corrected as shown below:

Claim 19, column 9, line 1, "plate means" should read --element--.

Signed and Sealed this

Nineteenth Day of August, 1997

*Attest:*

BRUCE LEHMAN

*Attesting Officer*      *Commissioner of Patents and Trademarks*